(12) United States Patent
Shin et al.

(10) Patent No.: US 11,644,927 B2
(45) Date of Patent: May 9, 2023

(54) DISPLAY DEVICE

(71) Applicant: LG Display Co., Ltd., Seoul (KR)

(72) Inventors: SeungHwan Shin, Paju-si (KR); DaeYoung Seo, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/916,824

(22) Filed: Jun. 30, 2020

(65) Prior Publication Data

US 2021/0132715 A1   May 6, 2021

(30) Foreign Application Priority Data

Oct. 30, 2019 (KR) .................. 10-2019-0136423

(51) Int. Cl.
*G06F 3/042* (2006.01)
*G09G 3/20* (2006.01)
*G06F 3/041* (2006.01)

(52) U.S. Cl.
CPC .......... *G06F 3/042* (2013.01); *G06F 3/04184* (2019.05); *G09G 3/20* (2013.01); *G09G 2300/0426* (2013.01); *G09G 2310/0272* (2013.01)

(58) Field of Classification Search
CPC ....... G06F 3/042; G06F 3/04184; G09G 3/20; G09G 2300/0426; G09G 2310/0272
See application file for complete search history.

(56) References Cited

U.S. PATENT DOCUMENTS

| 9,921,677 | B1 * | 3/2018 | Chen | .................... | H01L 27/1255 |
| 2014/0009442 | A1 * | 1/2014 | Kim | ..................... | G06F 3/0443 |
| | | | | | 438/30 |
| 2016/0054625 | A1 * | 2/2016 | Hsia | ..................... | G02F 1/13439 |
| | | | | | 349/138 |
| 2016/0216576 | A1 * | 7/2016 | Miyazaki | .............. | G02F 1/1368 |

* cited by examiner

*Primary Examiner* — Patrick N Edouard
*Assistant Examiner* — Eboni N Giles
(74) *Attorney, Agent, or Firm* — Fenwick & West LLP

(57) ABSTRACT

A display device is capable of sensing a user's touching or inputting by a laser pointer on a display panel, by means of arranging a photo transistor in some pixels of the display panel to sense off-current of the photo transistor according to a change in the quantity of external light. In addition, a common electrode overlapping a data line is arranged separately from a common electrode overlapping a read-out line from which a sensing signal is detected, thereby improving the sensing performance carried out simultaneously with the display driving, owing to reduced influence of noise caused by the display driving to the sensing signal.

21 Claims, 12 Drawing Sheets

9X3 SP

DISPLAY DEVICE

CROSS REFERENCE TO RELATED APPLICATIONS

This application claims priority from Republic of Korea Patent Application No. 10-2019-0136423, filed on Oct. 30, 2019, which is hereby incorporated by reference for all purposes as if fully set forth herein.

FIELD

Embodiments of the present disclosure relate to a display device.

BACKGROUND

Along with the development of the information society, the demand for display devices for displaying images is more and more increasing in various fields, and various types of display devices such as, for example, a liquid crystal display device, an organic light emitting display device, etc. are utilized.

For providing a variety of functions to user, such a display device provides the functions to recognize light by the user's finger, pen touch, laser pointer, etc. on its display panel and perform an input processing based on the recognized information.

Accordingly, there is a need to arrange a configuration for sensing on the display panel, but electrode, signal lines, and the like for driving the display device will have to be firstly arranged on the display panel, and thus such a limited design arrangement often gives rise to a problem that it becomes difficult to additionally arrange the configuration for sensing.

Moreover, a voltage variation caused by signals applied to the display panel according to the display driving may function as noise during the sensing, so there will often disadvantageously result in many difficulties in performing the sensing simultaneously with driving the display.

SUMMARY

Embodiments of the present disclosure provide a display device capable of sensing a user's touching or irradiating of light by a laser pointer onto a display panel simultaneously with display driving.

Embodiments of the present disclosure provide a display device capable of reducing the noise that may occur according to display driving in a sensing signal detected during a period of performing the display driving.

According to an aspect, there is provided a display device comprising a display panel in which a plurality of gate lines, a plurality of data lines and a plurality of subpixels are disposed, a plurality of photo transistors disposed in at least one subpixel of the plurality of subpixels, controlled by a photo control signal applied to a photo control line, and electrically connected to a photo driving line to which a photo driving voltage is applied, a plurality of read-out transistors electrically connected between the photo transistor and a read-out line, a first common electrode partially overlapping the read-out line, and a second common electrode partially overlapping the data line and being separated from the first common electrode.

According to another aspect, there is provided a display device comprising a plurality of driving transistors disposed in each of a plurality of subpixels, a plurality of read-out transistors disposed in some subpixels of the plurality of subpixels, a plurality of data lines electrically connected to the driving transistors, a plurality of read-out lines electrically connected to the read-out transistors, a first common electrode partially overlapping the read-out line, and a second common electrode partially overlapping the data line and being separated from the first common electrode.

According to the embodiments of the present disclosure, it is possible to accumulate electrical charges generated by a touching or irradiation of external light onto a display panel by means of photo transistors arranged in some sub-pixels, and then detect the accumulated electrical charges through the read-out transistor controlled by a gate line to perform a sensing operation, thereby sensing the user's touching and others onto the display panel simultaneously with the display driving.

According to the embodiments of the present disclosure, it is possible to improve the sensing performance owing to reduced display noise in a sensing signal detected through the read-out line, by means of arranging a portion of the common electrode overlapping the data line to which the data voltage is applied, separated from a portion of the common electrode overlapping the read-out line in which the sensing signal is detected.

DESCRIPTION OF DRAWINGS

The above and other objects, features, and advantages of the present disclosure will be more clearly understood from the following detailed description, taken in conjunction with the accompanying drawings.

DETAILED DESCRIPTION

Figure 1:
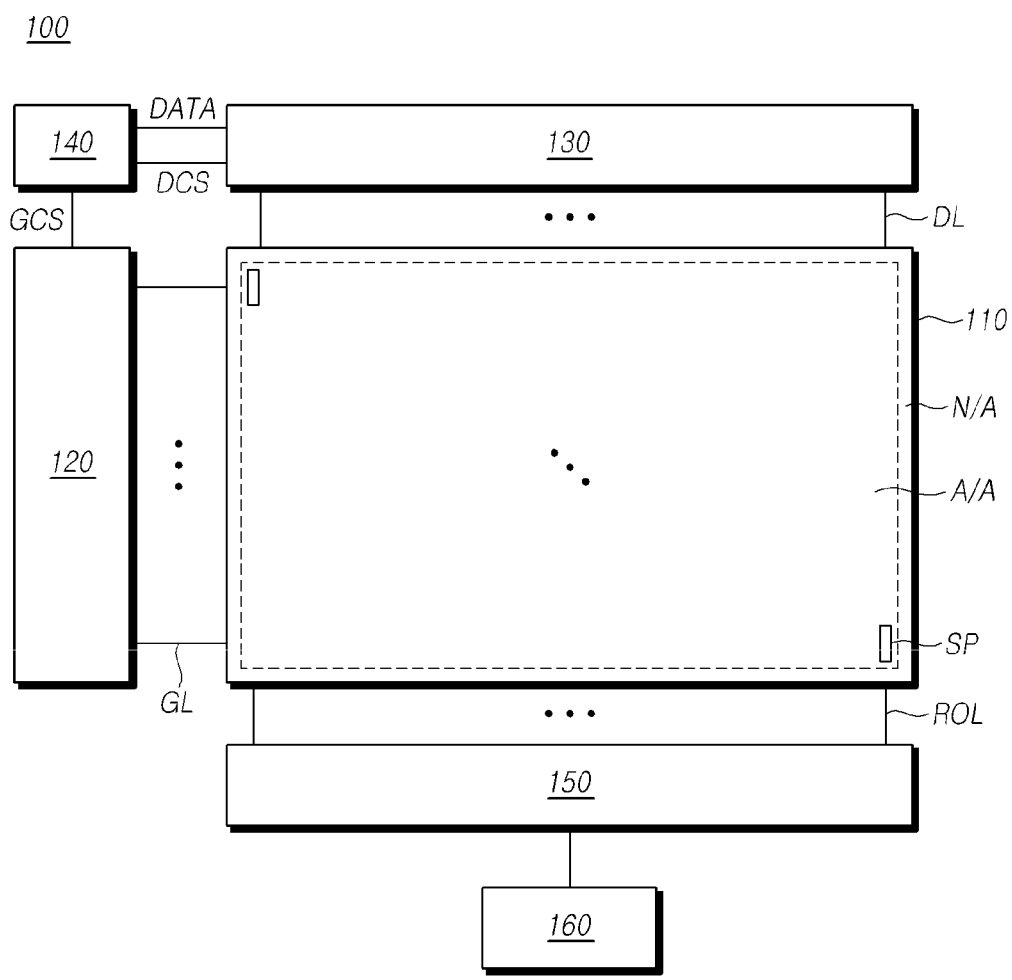
FIG. 1 illustrates a schematic configuration of a display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present invention rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present invention. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 illustrates a schematic configuration of a display device 100 according to embodiments of the present disclosure.

Referring to FIG. 1, the display device 100 according to embodiments of the present disclosure may include a display panel 110, a gate driving circuit 120, a data driving circuit 130, and a controller 140. Further, the display device may include a sensing circuit 150 for sensing touching or external light onto the display panel 110, and a sensing controller 160.

A plurality of gate lines GL and a plurality of data lines DL may be disposed in the display panel 110, and a plurality of sub-pixels SP may be disposed in an area where the gate lines GL is intersected with the data lines DL.

Further, a circuit element or the like constituting a sensor for a sensing operation may be disposed in at least some sub-pixels SP of the plurality of sub-pixels SP, and a plurality of read-out lines ROL to electrically connect the sensor and the sensing circuit 150 to each other may be disposed in the display panel 110.

The gate driving circuit 120 may be configured to control the plurality of gate lines GL disposed on the display panel 110 and control a driving timing of the subpixel SP. Further, the data driving circuit 130 may be configured to supply a data voltage Vdata corresponding to image data to the sub-pixel SP in order to control the sub-pixel SP to render the brightness corresponding to the gradation of the image data.

In more detail, the gate driving circuit 120 may be configured to be controlled by the controller 140 to sequentially output a scan signal to the plurality of gate lines GL arranged in the display panel 110, thereby controlling the driving timing of the plurality of sub-pixels SP.

The gate driving circuit 120 may include one or more gate driver integrated circuits (GDIC), and may be arranged on either one side or both sides of the display panel 110 according to its driving scheme.

Each gate driver integrated circuit (GDIC) may be configured to be connected to a bonding pad of the display panel 110 with Tape Automated Bonding (TAB) or Chip-On-Glass (COG) method, or may be implemented in Gate-In-Panel (GIP) type to be directly disposed on the display panel 110, and further, on some occasions, it may be integrated to be disposed on the display panel 110. In addition, a respective gate driver integrated circuit (GDIC) may be implemented in Chip-On-Film (COF) method in which it is mounted on a film connected to the display panel 110.

The data driving circuit 130 may be configured to receive the image data (or input data) from the controller 140 and then convert the image data to data voltage in an analog form. Then, the data voltage is output to each data line DL in line with the timing at which the scan signal is applied through the gate line GL, so that each sub-pixel SP expresses the brightness according to the image data.

The data driving circuit 130 may include one or more source driver integrated circuits (SDICs).

Each source driver integrated circuit (SDIC) may include a shift register, a latch circuit, a digital-to-analog converter, an output buffer, and the like.

Then, each source driver integrated circuit (SDIC) may be connected to a bonding pad of the display panel 110 by the Tape Automated Bonding (TAB) method or Chip-On-Glass (COG) method, or may be directly disposed to the display panel 110, and further, on some occasions, it may be integrated to be disposed in the display panel 110. Further, each source driver integrated circuit (SDIC) may be implemented in the chip-on-film (COF) method, wherein the respective source driver integrated circuit (SDIC) may be mounted on a film connected to the display panel 110 and then electrically connected to the display panel 110 through a wiring on the film.

The controller 140 may be configured to supply various control signals to the gate driving circuit 120 and the data driving circuit 130 to control the operation of the gate driving circuit 120 and the data driving circuit 130 as required.

The controller 140 allows the gate driving circuit 120 to output a scan signal according to the timing implemented in each frame, and convert the image data received from the outside in line with the data signal format used by the data driving circuit 130 to output the converted video data to the data driving circuit 130.

The controller 140 may be configured to receive, together with the image data, various timing signals inclusive of e.g., a vertical synchronization signal (VSYNC), a horizontal synchronization signal (HSYNC), an input data enable signal (DE: Data Enable), and a clock signal (CLK), from the outside (e.g., a host system).

The controller 140 may be configured to generate various control signals using the various timing signals received from the outside and then transfer the generated control signals to the gate driving circuit 120 and the data driving circuit 130.

As an example, the controller 140 may be configured to output various gate control signals (GCS) inclusive of e.g., a gate start pulse (GSP), a gate shift clock (GSC), a gate output enable signal GOE and so on, for controlling the gate driving circuit 120.

Here, the gate start pulse (GSP) serves to control the operation start timing for one or more gate driver integrated circuits (GDIC) constituting the gate driving circuit 120. The gate shift clock GSC is a clock signal commonly input to one or more gate driver integrated circuits (GDICs), serving to control the shift timing of the scan signal. The gate output enable signal GOE is used to specify timing information of one or more gate driver integrated circuits (GDICs).

Further, in order to control the data driving circuit 130, the controller 140 may be adapted to output various data control signals DCS inclusive of e.g., a source start pulse (SSP), a source sampling clock (SSC), a source output enable signal (SOE).

Here, the source start pulse SSP serves to control the data sampling start timing for one or more source driver integrated circuits (SDICs) constituting the data driving circuit 130. The source sampling clock SSC is a clock signal for controlling the sampling timing of data in each of the source driver integrated circuits (SDICs). The source output enable signal SOE serves to control the output timing of the data driving circuit 130.

This display device 100 may include a power management integrated circuit (not shown) to supply various voltages or currents to the display panel 110, the gate driving circuit 120, the data driving circuit 130, the sensing circuit 150 and others, or control such various voltages and/or currents to be fed thereto.

Each sub-pixel SP may be defined by intersection of the gate line GL and the data line DL, wherein a liquid crystal or a light emitting device may be disposed according to the type of the display device 100.

For example, when the display device 100 is of a liquid crystal display element, it may include a light source device such as e.g., a backlight unit irradiating light to the display panel 110, wherein the liquid crystal is disposed in the subpixel SP of the display panel 110. Thus, an image can be displayed with the brightness according to the image data, by allowing the arrangement of the liquid crystals to be arranged by an electric field formed according to the data voltage Vdata applied to each sub-pixel SP.

In another example, when the display device 100 is of an organic light emitting display device, an organic light emitting diode (OLED) may be disposed in each subpixel SP, and a current flowing through the organic light emitting diode OLED may be controlled according to the data voltage Vdata supplied to the subpixel SP, so that the brightness can be displayed in accordance with the image data.

Alternatively, on some occasions, at least one light emitting diode (LED) may be disposed in each subpixel (SP) for displaying the image.

The display device 100 according to the embodiments of the present disclosure may be configured to sense a user's touching or external light onto the display panel 110 by using at least one sensor disposed in at least some subpixels SP.

For example, a photo transistor PHT for outputting off-current in response to light may be disposed on some subpixels SP of the display panel 110, and the off-current output by the photo transistor PHT may be then detected so that external light incident on the display panel 110 can be sensed.

In other words, by detecting the off-current generated by the external light with the photo transistor PHT being turned off, it is allowed to sense the external light irradiated by a laser pointer or the like onto the display panel 110, and then perform an input processing based on the sensed result.

Further, when a user's finger or pen touches the display panel 110, the user's touching can be recognized by detecting a change in the amount of light incident on the photo transistor PHT.

This photo transistor PHT may be electrically connected to a read-out line ROL disposed on the display panel 110. Further, the sensing circuit 150 may be configured to detect a sensing signal through the read-out line ROL connected to a sensor such as the phototransistor PHT and sense a user's touching or irradiation of external light on the display panel 110.

The sensing circuit 150 may include, for example, an amplifier electrically connected to the read-out lines ROL, an integrator for integrating the output signal of the amplifier to output an integral value, and a sample and hold circuit for storing the integral value of the integrator. Further, the sensing circuit 150 may include an analog-to-digital converter for converting the analog sensing signal to a digital signal.

The sensing circuit 150 may be configured to output sensing data, obtained by converting the sensing signal detected through the read-out line ROL into a digital signal, to the sensing controller 160.

The sensing controller 160 may be configured to control the sensing circuit 150 and sense a touching or irradiation of external light on the display panel 110 using the sensing data received from the sensing circuit 150.

Here, the signal detection through the read-out line ROL may be performed independently of the display driving, but according to circumstances, the detection of the sensing signal through the read-out line ROL may be carried out based on the signals applied for the display driving.

The data driving circuit 130 and the sensing circuit 150 included in the display device 100 according to the embodiments of the present disclosure may be disposed in the display device 100 with a single integrated circuit (IC).

Figure 2:
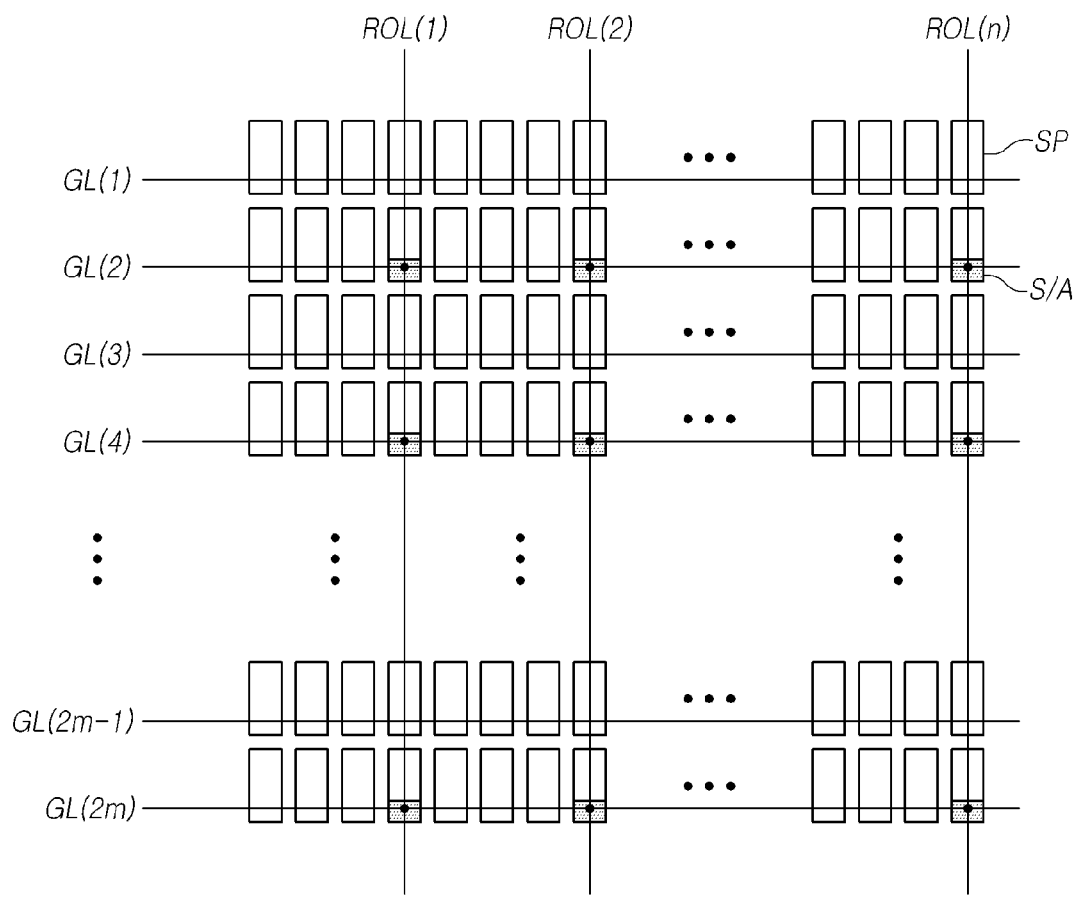
FIG. 2 illustrates an example of a schematic sensing structure of a display device according to embodiments of the present disclosure.

FIG. 2 illustrates an example of a schematic sensing structure of a display device 100 according to embodiments of the present disclosure.

Referring to FIG. 2, there are arranged a plurality of gate lines GL for driving circuit elements disposed in a subpixel SP of the display panel 110. Although FIG. 2 illustrates an example in which one gate line GL is arranged in each row of subpixel SP, more than one gate lines GL for driving each subpixel SP row may be disposed depending on the type of the display device 100.

In each subpixel SP may be disposed a circuit element for the display driving, a light emitting element, or a liquid crystal, etc.

In addition, at least some subpixels SP of the plurality of subpixels SP disposed on the display panel 110 may include a sensor area S/A in which circuit elements constituting a sensor are disposed.

For example, as illustrated in FIG. 2, one sensor area S/A may be included for every eight subpixels SP, wherein these eight subpixels SP may form one sensing unit area. FIG. 2 merely shows an example of such a configuration, and the sensor area S/A may be disposed one by one for every more than eight subpixels SP, or may be disposed one by one for every less than eight subpixels SP. Here, for the convenience of description, the sensor area S/A is illustrated to be disposed in one subpixel SP, for example, but on some occasions, the sensor area S/A may be disposed in two or more adjacent subpixels SP.

In the sensor area S/A may be disposed some circuit elements constituting the sensor, wherein for example, one or more photo transistors PHT and one or more read-out transistors ROT may be disposed in the sensor area S/A. In addition, in some cases, the sensing capacitor Cs may be further disposed therein.

Those circuit elements disposed in the sensor area S/A may be electrically connected to a read-out line ROL connected to the sensing circuit 150, and for example, the read-out transistor ROT arranged in the sensor area S/A may be electrically connected to the read-out line ROL.

This read-out transistor ROT may be electrically connected between the read-out line ROL and the phototransistor PHT.

Here, although the signal line for controlling the read-out transistor ROT may be separately disposed, the gate line GL disposed on the display panel 110 may be electrically connected to a gate node of the read-out transistor ROT. Thus, the read-out transistor ROT may be turned on/off by the scan signal applied to the gate line GL.

Then, as the amount of light incident on the photo transistor PHT changes by a touching or by a laser pointer, electrical charges may be accumulated due to an off-current of the photo transistor PHT. Thus, as the read-out transistor ROT is turned on, the accumulated charges can be detected through the read-out line ROL.

Specifically, as illustrated in FIG. 2, a gate line GL may be disposed in each row of subpixel SP, and a read-out line ROL may be disposed in every four columns of subpixels SP. Further, the sensor area S/A may be arranged for every eight subpixels SP.

Therefore, as it is generated the off-current of the photo transistor PHT disposed in the sensor area S/A while the scan signal is applied to the gate line GL not connected to the sensor area S/A, the electrical charge can be accumulated. Then, the read-out transistor ROT disposed in the sensor area S/A may be turned on during a period in which the scan signal is applied to the gate line GL connected to the sensor area S/A, so that a sensing signal can be detected through the read-out line ROL.

Here, although it is illustrated that the sensor area S/A is provided for, e.g., every eight subpixels SP as described above, the sensor areas S/A may be arranged so that one sensor area S/A is provided for more than eight subpixels SP, or otherwise, for less than eight subpixels.

Accordingly, in case where one sensor area S/A is provided for every two rows of sub-pixels SP, as illustrated in FIG. 2, and if there exist m sensor areas S/A connected to one read-out line ROL, wherein m is a natural number, then it will allow 2m gate lines GL to be arranged. Alternatively, if one sensor area S/A is provided for every k rows of subpixels SP, and there exist m sensor areas S/A connected to one read-out line ROL, then it will allow m*k gate lines GL to be arranged.

Thus, as the number of sub-pixels SP in which one sensor area S/A is present is reduced, it will be possible to increase the resolution in sensing. Alternatively, as the number of sub-pixels SP in which one sensor area S/A is present is increased, it will increase the amount of electrical charges accumulated by the off-current of the photo transistor PHT so as to enhance the sensitivity of the sensing.

As described above, it is possible to more easily arrange the configuration for sensing in the display panel 110, by disposing a sensor area S/A including a photo transistor PHT or the like in some sub-pixels SP of the plurality of sub-pixels SP disposed in the display panel 110. Further, it is possible to perform the sensing simultaneously with the display driving, by detecting the sensing signal at the timing at which the scan signal is applied through the gate line GL connected to the sensor area S/A.

Thus, it is also possible to reduce the number of channels required to detect the sensing signal from each sensor area S/A in the sensing circuit 150, by controlling the timing at which the sensing signal is detected from the sensor area S/A by the gate line GL.

As an example, in case that the number of sensor areas S/A arranged in one column of subpixels SP is m, m channels may be required to separately detect the sensing signal from each sensor area S/A.

However, according to the embodiments of the present disclosure, the sensing can be performed using one channel by allowing one read-out line ROL to be connected to m sensor areas S/A and controlling detection timing of the sensing signal by the gate line GL connected to each sensor area S/A. Thus, it is possible to perform the sensing while reducing the number of required channels to 1/m.

As apparent from the foregoing description, the embodiments of the present disclosure makes it possible to sense a touching or external light on the display panel 110, by additionally arranging the sensor area S/A in which the photo transistor PHT, the read-out transistor ROT, and so on are disposed, and the read-out line ROL, etc. In addition, it will be possible to arrange such a configuration for the sensing with minimal influence on the configuration arranged for the display driving.

Figure 3:
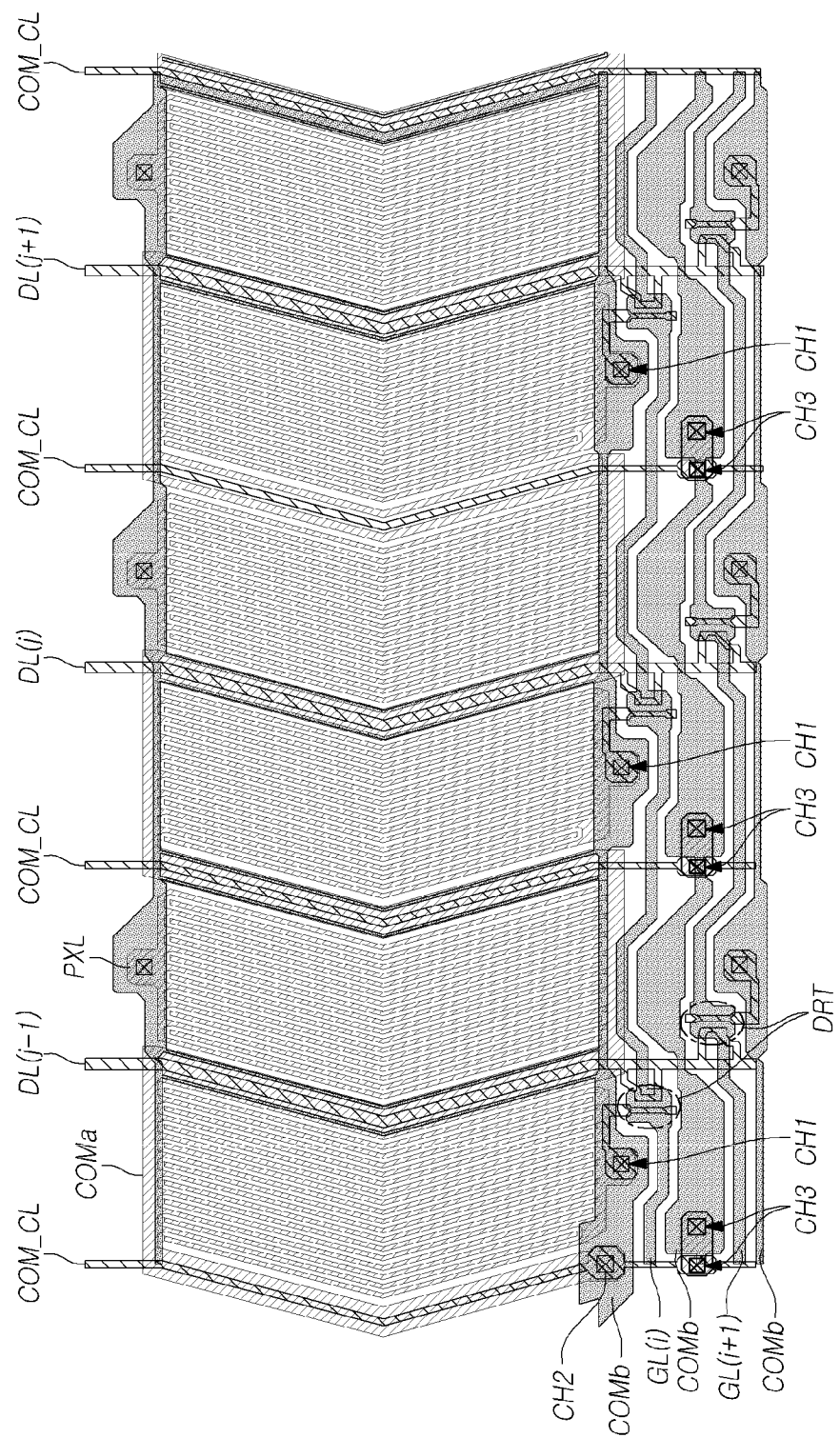
FIG. 3 illustrates an example of a structure of a subpixel including no sensor area of subpixels disposed in a display device according to embodiments of the present disclosure.
Figure 4:
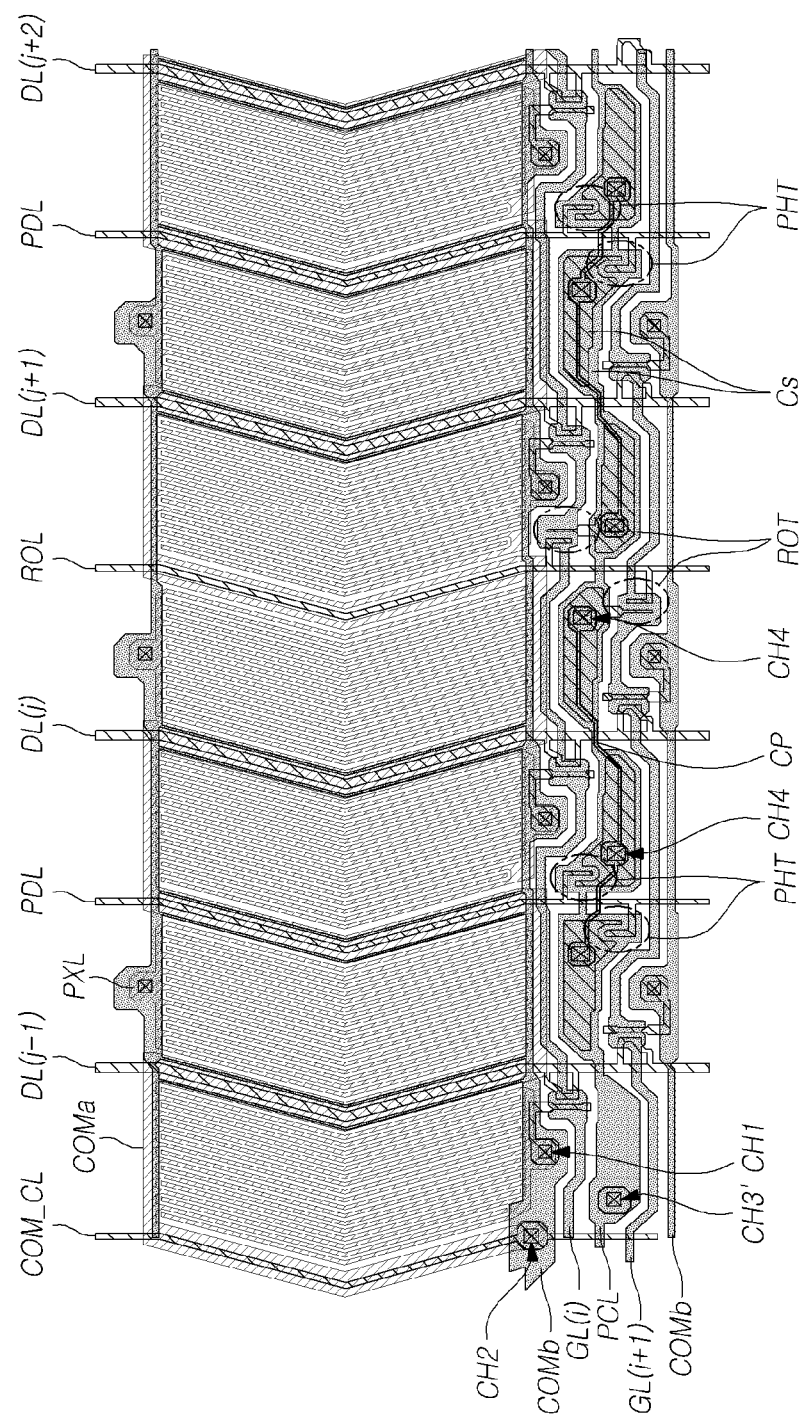
FIG. 4 illustrates an exemplary structure of a subpixel including a sensor area of subpixels disposed in a display device according to embodiments of the present disclosure.

FIGS. 3 and 4 each illustrate an example of the structure of a subpixel SP disposed in a display device 100 according to embodiments of the present disclosure, wherein FIG. 3 shows an example of the structure of a subpixel SP including no sensor area S/A, while FIG. 4 shows an example of the structure of a subpixel SP including a sensor area S/A.

Referring first to FIG. 3, it is seen that the gate lines GL may be arranged in one direction. Here, as an example, two gate lines GL(i) and GL(i+1) may be disposed for a row of subpixels SP, wherein the gate line GL(i) may drive some of the subpixels SP in a row shown FIG. 3, and the gate line GL(i+1) may drive some of the sub-pixels SP in the next row.

The data line DL may be arranged in a direction intersecting with the direction in which the gate lines GL are arranged, wherein the data lines DL may be arranged, for example, one for every two subpixel columns. Further, the data voltage Vdata supplied to the subpixels SP disposed on both sides of the data line DL may be supplied by one data line DL.

A driving transistor DRT controlled by the gate line GL and connected to the data line DL may be disposed in each subpixel SP. Further, a pixel electrode PXL electrically connected to the driving transistor DRT may be disposed for each subpixel SP. The driving transistor DRT and the pixel electrode PXL may be electrically connected through a first contact hole CH1.

A common electrode COM, to which a common voltage Vcom is applied, may be disposed in a plurality of subpixels SP. The common electrode COM may be applied with the common voltage Vcom during the display driving period, and may form an electric field with the pixel electrode PXL to which the data voltage Vdata is applied.

The common electrode COM may be electrically connected to a common electrode connection wiring COM_CL. The common electrode connection wiring COM_CL may be disposed on the same layer as the data line DL and disposed in an area where any data line DL is not disposed. The common electrode COM may be electrically connected to the common electrode connection wiring COM_CL through a second contact hole CH2.

Here, the common electrode COM may include a first portion COMa disposed on the same layer as the pixel electrode PXL and a second portion COMb disposed on the same layer as the gate line GL.

The first portion COMa and the second portion COMb of the common electrode COM may be electrically connected via the second contact hole CH2 or a third contact hole CH3. For example, the first portion COMa and the second portion COMb of the common electrode COM may be directly connected to each other through the second contact hole CH2. Further, the common electrode COM and the common electrode connection wiring COM_CL may be directly connected to each other through the second contact hole CH2. The second portion COMb of the common electrode COM connected via the second contact hole CH2 may be disposed in a shape enveloping the outside of the pixel electrode PXL on a plane.

In addition, the second portion COMb of the common electrode COM and the common electrode connection wiring COM_CL may be electrically connected to each other through the third contact hole CH3. Here, the second portion COMb of the common electrode COM and the common electrode connection wiring COM_CL may be directly connected by a single third contact hole CH3, and alternatively, as illustrated in FIG. 3, the second portion COMb of the common electrode COM and the common electrode connection wiring COM_CL may be electrically connected by two third contact holes CH3 and a different material (for example, a material forming the pixel electrode). Thus, the second portion COMb of the common electrode COM disposed between the gate lines GL may be electrically connected to the first portion COMa of the common electrode COM through the common electrode connection wiring COM_CL.

Here, the second portion COMb of the common electrode COM positioned at the portion in which the third contact hole CH3 is formed may be disposed in the same form as a photo control line PCL disposed in a sensor area S/A to be described later. In other words, as the photo control line PCL is disposed to drive the sensor area S/A, metal may be disposed at a position corresponding to the photo control line PCL even in the area where any sensor area S/A is not arranged. Furthermore, the metal may be electrically connected to the common electrode COM and be used as the common electrode COM.

Further, as circumstances require, an area in which no sensor area S/A is positioned may be disposed in the same column as the sensor area S/A. In this case, a signal line for driving the sensor area S/A, such as the read-out line ROL, may be disposed in an area where the common electrode connection wiring COM_CL is disposed. Then, since the read-out line ROL is not electrically connected to the second portion COMb of the common electrode COM disposed between the gate lines GL, the read-out line ROL may be arranged in such a structure that it passes over the second portion COMb of the common electrode COM in the area corresponding to the third contact hole CH3.

A capacitance may be formed between a source electrode of the driving transistor DRT and the common electrode COM, by the second portion COMb of the common electrode COM disposed on a different layer from the pixel electrode PXL. Therefore, it is possible to increase the electric field formed between the pixel electrode PXL and the common electrode COM, owing to disposing the second portion COMb of the common electrode COM positioned on a different layer from the pixel electrode PXL, in the structure in which the first portion COMa of the common electrode COM is disposed on the same layer as the pixel electrode PXL. The second portion COMb of the common electrode COM may be disposed in consideration of forming capacitance with a source electrode of the driving transistor DRT, as well as connecting with the pixel electrode PXL, connecting with the first portion COMa of the common electrode COM, and connecting with the common electrode connection wiring COM_CL. Furthermore, the second portion COMb of the common electrode COM may be symmetrically arranged with respect to the data line DL.

The sub-pixel SP including the sensor area S/A among these sub-pixels may have a different structure of arrangement from the common electrode COM or the common electrode connection wiring COM_CL connected to the common electrode COM.

Referring then to FIG. 4, for example, the sensor area S/A may be disposed in six subpixels SP. The photo transistor PHT may be disposed in four sub-pixels SP of the six sub-pixels SP shown in FIG. 4, and a read-out transistor ROT may be disposed in two sub-pixels SP.

A photo control line PCL electrically connected to a gate node of the photo transistor PHT may be disposed between the gate line GL(i) and the gate line GL(i+1). This photo control line PCL may be disposed on the same layer as the gate line GL, and the photo control line PCL may be disposed between the two gate lines GL. That is, the photo control line PCL may be disposed at a position corresponding to the second portion COMb of the common electrode COM disposed between the gate lines GL in the region where no sensor area S/A is arranged.

Further, the common electrode connection wiring COM_CL may be disposed to pass on the photo control line PCL without being connected to the photo control line PCL in the region where the third contact hole CH3' is formed. In other words, the read-out line ROL or the like may be disposed in a similar way to the structure not connected to the second portion COMb of the common electrode COM disposed in the area where no sensor area S/A is positioned.

A photo driving line PDL electrically connected to the photo transistor PHT may be disposed between the data line DL(j−1) and the data line DL(j), and between the data line DL(j+1) and the data line DL(j+2). This photo driving line PDL may be disposed on the same layer as the data line DL.

Further, a read-out line ROL electrically connected to the read-out transistor ROT may be disposed between the data line DL(j) and the data line DL(j+1). This read-out line ROL may be disposed on the same layer as the data line DL.

The photo transistor PHT and the read-out transistor ROT may be electrically connected to each other. For example, the photo transistor PHT and the read-out transistor ROT may be electrically connected to each other by a connection pattern CP disposed on the same layer as the pixel electrode PXL. That is, the connection pattern CP may be electrically connected to the photo transistor PHT, the read-out transistor ROT, and the like through a fourth contact hole CH4. Therefore, the photo transistor PHT and the read-out transistor ROT may be electrically connected to each other with the connection pattern CP.

Then, at least a portion of the electrode connecting the photo transistor PHT and the read-out transistor ROT may overlap the photo control line PCL. In other words, the sensing capacitor Cs formed by the photo control line PCL may be disposed between the photo transistor PHT and the read-out transistor ROT. This sensing capacitor Cs may be disposed as a separate capacitor, as illustrated in FIG. 4, but on some occasions, it may mean a parasitic capacitor formed by the photo control line PCL or the like.

As aforementioned, a portion of the common electrode connection wiring COM_CL or the second portion COMb of the common electrode COM may be removed from the subpixel SP including the sensor area S/A. Further, the photo driving line PDL and the photo control line PCL for driving the photo transistor PHT, or the read-out line ROL for detecting a signal through the read-out transistor ROT may be disposed therein.

In addition, the gate line GL may be electrically connected to the gate node of the read-out transistor ROT. Thus, any separate signal line for controlling the read-out transistor ROT may not be disposed.

Furthermore, it is possible to sense a touching or irradiation of external light on the display panel 110 by using the photo transistor PHT and the read-out transistor ROT during the display driving period.

Figure 5:
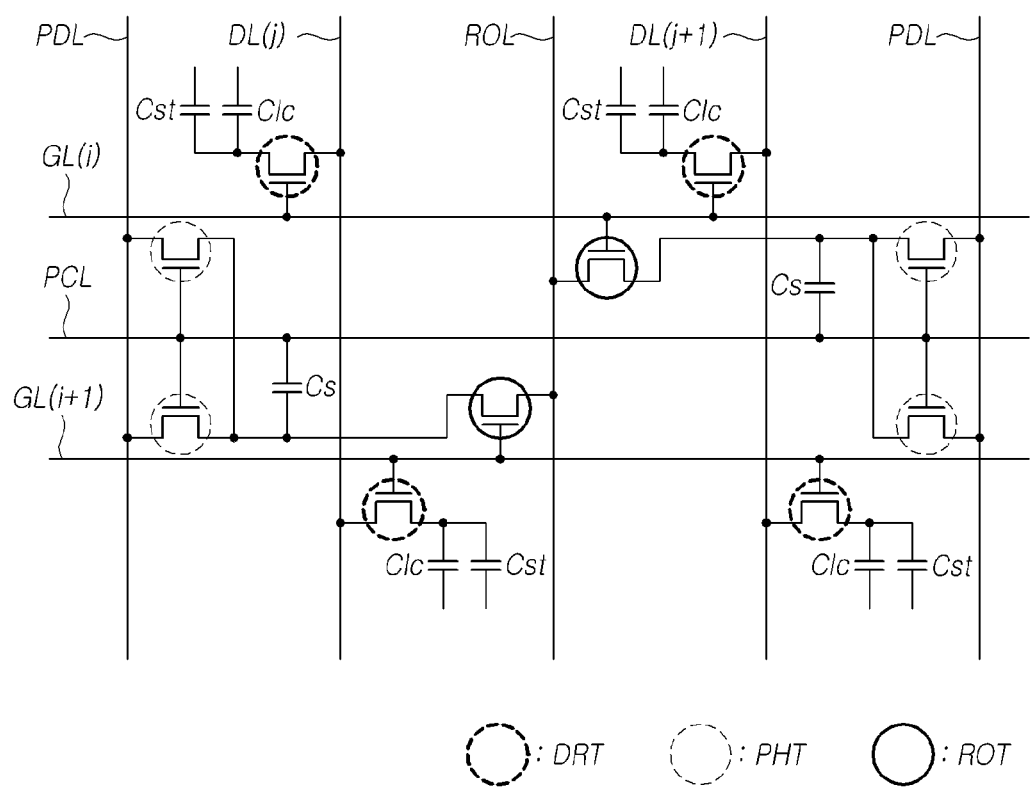
FIG. 5 illustrates an example of the circuit configuration of a subpixel including a sensor area of subpixels disposed in a display device according to embodiments of the present disclosure.

FIG. 5 illustrates an example of the circuit structure of a subpixel SP including a sensor area S/A in a display device 100 according to embodiments of the present disclosure.

Referring to FIG. 5, it is seen that gate lines GL may be disposed, and a photo control line PCL may be disposed between the gate line GL(i) and the gate line GL(i+1). In addition, data lines DL may be disposed, and a photo driving line PDL, a read-out line ROL, and so on may be arranged alternately with the data lines DL(j) and DL(j+1).

A driving transistor DRT for the display driving may be disposed in each subpixel SP, and a storage capacitor Cst, a liquid crystal capacitor Clc, and the like may be formed by a pixel electrode PXL and a common electrode COM.

Further, one or more photo transistors PHT controlled by the photo control line PCL and electrically connected to the photo driving line PDL may be disposed in the sub-pixel SP.

A signal at a voltage level to turn off the photo transistor PHT may be applied through the photo control line PCL, and a certain level of constant voltage may be applied to the photo driving line PDL.

Accordingly, when external light is incident on the phototransistor PHT or a change in the amount of light incident on the phototransistor PHT occurs, the off-current may be output through the phototransistor PHT.

Then, electric charges may accumulate in the sensing capacitor Cs formed by the photo transistor PHT and the photo control line PCL due to the off-current output through the photo transistor PHT.

The read-out transistor ROT may be controlled by the gate line GL, and be electrically connected between the read-out line ROL and the photo transistor PHT. Thus, when the scan signal is applied to the gate line GL, the read-out transistor ROT is turned on, and thus, the electrical charges accumulated in the sensing capacitor Cs can be detected through the read-out line ROL.

In other words, the charges due to the off-current of the photo transistor PHT in the sensor area S/A may accumulate in a period in which the scan signal is applied via the gate line GL driving the sub-pixel SP where no sensor area S/A is disposed. Then, the sensing signal may be detected through the read-out line ROL in a period in which the scan signal is applied via the gate line GL driving the subpixel SP where the sensor area S/A is disposed.

Accordingly, it is possible to sense a touching or irradiation of external light on the display panel 110 simultaneously with the display driving.

Figure 6:
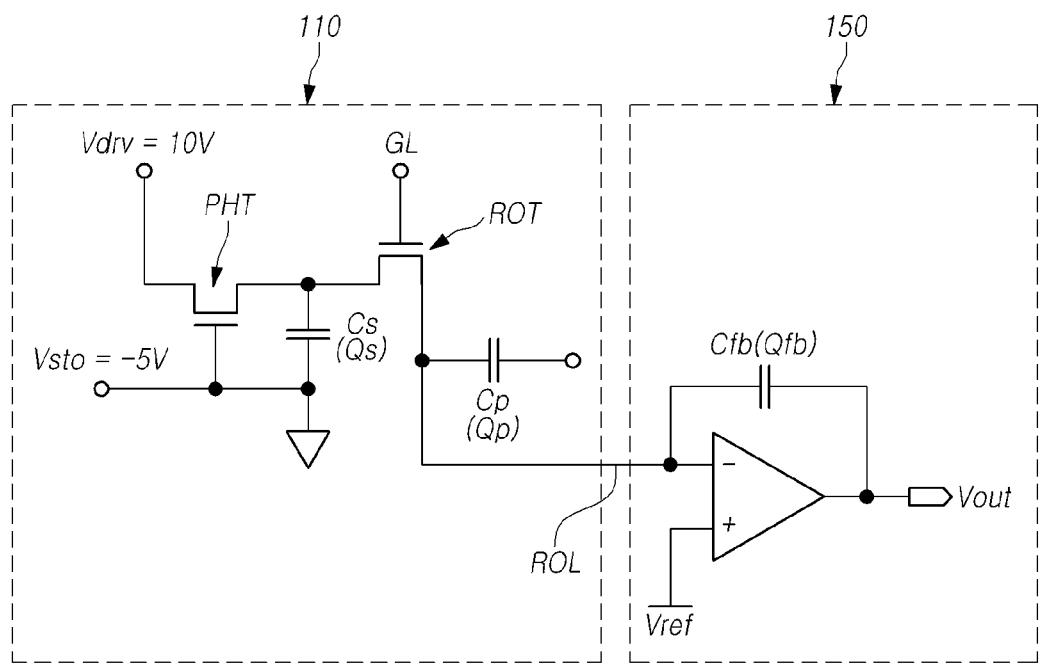
FIG. 6 illustrates an example of the circuit connection for a sensing circuit and circuit elements disposed in a sensor area of a display device according to embodiments of the present disclosure.

FIG. 6 illustrates an example of the circuit connection for a sensing circuit 150 and circuit elements disposed in a sensor area S/A of a display device 100 according to embodiments of the present disclosure. Further, FIGS. 7A and 7B each illustrate an example of the sensing scheme of a display device 100 according to embodiments of the present disclosure.

Referring first to FIG. 6, a photo control signal Vsto with a level (e.g., −5 V) to turn off a photo transistor PHT may be applied to the photo control line PCL. Further, a photo driving voltage Vdrv of a constant voltage (e.g., 10V) may be applied to the photo transistor PHT through the photo driving line PDL.

Here, the read-out transistor ROT controlled by the gate line GL may be in a turned-off state. Thus, electrical charges may be accumulated in a sensing capacitor Cs due to the off-current generated when light is incident on the photo transistor PHT.

When a scan signal with a level to turn on the read-out transistor ROT is applied to the gate line GL, it turns on the read-out transistor ROT so that the charge accumulated in the sensing capacitor Cs may be detected through the sensing circuit 150.

That is, the read-out transistor ROT may be turned on in a period in which the driving transistor DRT disposed in the subpixel SP including the sensor area S/A is turned on.

Then, as a reference voltage Vref is applied to a non-inverting input terminal of an amplifier disposed in the sensing circuit 150, the charge accumulated through the read-out line ROL may be input to an inverting input terminal of the amplifier, so that the charge may accumulate in the capacitor Cfb to allow a value of an output signal Vout to decrease. Here, the reference voltage Vref may be of a constant voltage, or may be a maximum voltage that can be output by the amplifier to reduce shift direction of the output signal Vout due to noise.

Figure 7A:
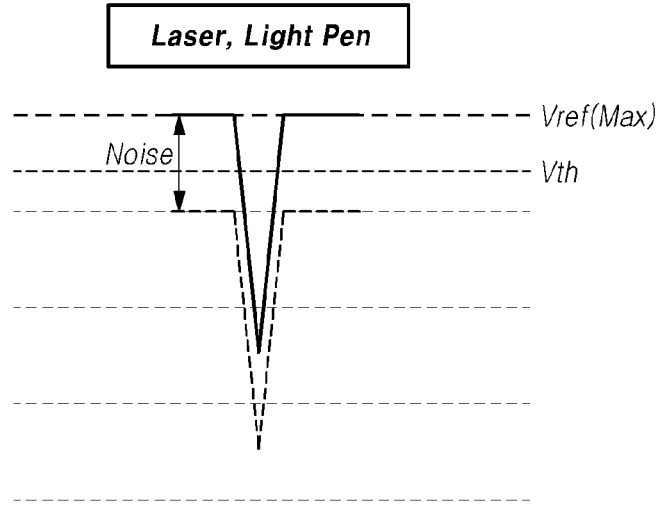
FIGS. 7A and 7B each illustrate an example of the sensing scheme of a display device according to embodiments of the present disclosure.

As an example, as illustrated in FIG. 7A, when external light from a laser pointer or a light pen enters the photo transistor PHT disposed in the sensor area S/A of the display panel 110, the value of the output signal Vout can go down due to the off-current of the photo transistor PHT. When this output signal Vout becomes smaller than a predetermined threshold value Vth, it is possible to detect the external light incident onto the corresponding sensor area S/A by a laser pointer or the like.

Figure 7B:
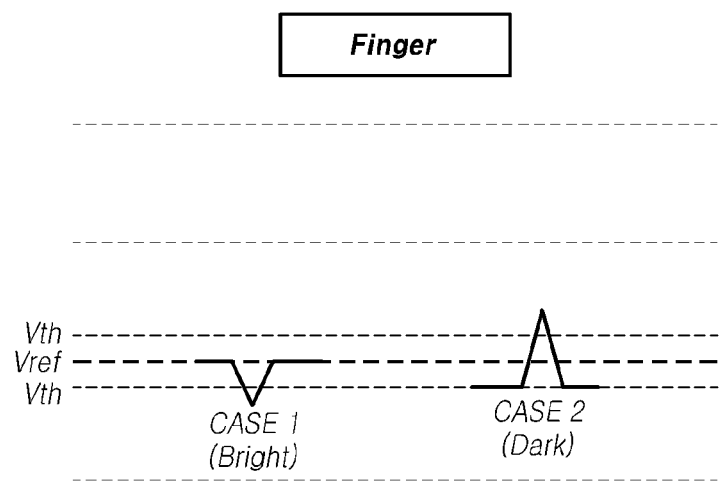

As another example, as illustrated in FIG. 7B, it is possible to sense a touching by a user onto the display panel 110, based on a change in the amount of light by the user's finger touching on the sensor area S/A of the display panel 110.

In case where the illuminance of a backlight unit provided within the display device 100 is larger (i.e., brighter) than the external illuminance, as shown in CASE 1 of FIG. 7B, the light emitted from the backlight unit can be reflected by the user's finger when the finger touches the sensor area S/A of the display panel 110. Then, when the light reflected off the user's finger reaches the photo transistor PHT, the off-current of the photo transistor PHT may be generated, which in turn enables to detect whether or not the user's finger has touched the sensor area or its touched coordinates by sensing the generated off-current.

Otherwise, in case where the illuminance of the backlight unit is less (i.e., darker) than the external illuminance, as in CASE 2 of FIG. 7B, the external light is blocked by the finger when the finger touches the sensor area S/A of the display panel 110, so that the sensor area S/A can become darker than the surroundings. That is, the amount of light incident on the photo transistor PHT may decrease. At this point, as the off-current of the photo transistor PHT decreases, the value of the output signal Vout of the amplifier may increase. Hence, it is possible to detect a touching by finger as the value of the output signal Vout becomes greater than the threshold Vth.

As described above, according to the embodiments of the present disclosure, it is possible to sense a user's touching or external light irradiated by a laser pointer onto the display panel 110, by using at least one sensor area S/A located in some sub-pixels SP and including the photo transistor PHT, the read-out transistor ROT, and others.

Here, the parasitic capacitance Cp may be formed between the read-out line ROL in which the sensing signal is detected and other electrodes or signal lines disposed on the display panel 110, and thus, the parasitic capacitance Cp may cause noise to be generated in the output signal Vout detected from the sensing circuit 150.

For example, as illustrated in FIG. 7A, when the noise due to parasitic capacitance Cp is generated, the output signal Vout may be shifted to effect no sensing even if external light is irradiated by the laser pointer. In particular, when a touch sensing is made for a finger having a small range of fluctuation in the output signal Vout, the sensing may be difficult as the noise tends to affect the output signal.

Thus, the embodiments of the present disclosure provide a solution for reducing the noise in a sensing signal detected through the read-out line ROL connected to a sensor area S/A.

Figure 8:
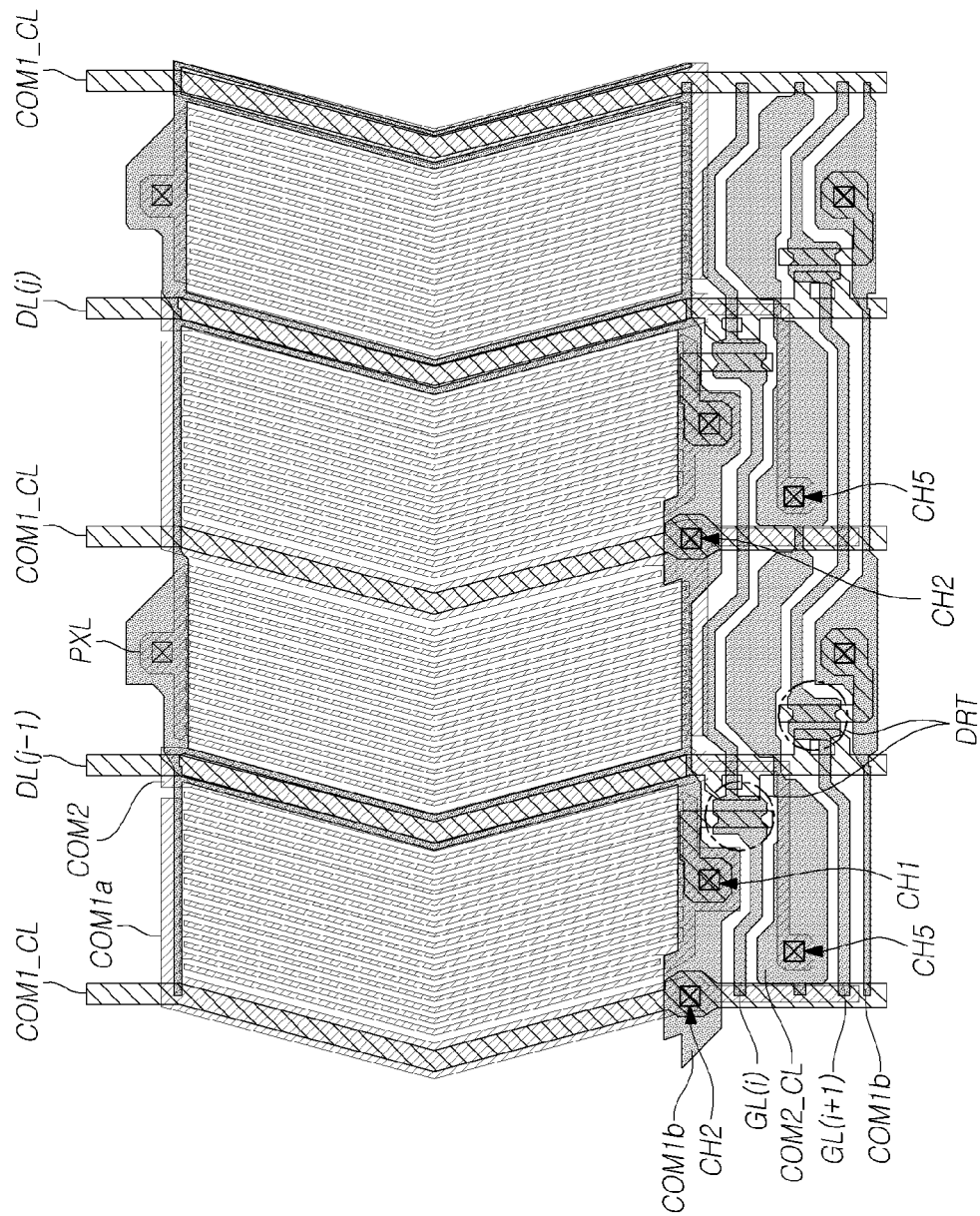
FIG. 8 illustrates another example of the structure of a subpixel disposed in a display device according to embodiments of the present disclosure.

FIG. 8 illustrates another example of the structure of a subpixel disposed in a display device 100 according to embodiments of the present disclosure.

Referring to FIG. 8, the gate lines GL may be arranged in one direction, and the data lines DL may be arranged in a direction intersecting with the gate lines GL. The data line DL may be disposed for every two subpixels SP.

A driving transistor DRT may be disposed in each subpixel SP, and a pixel electrode PXL electrically connected to the driving transistor DRT through a first contact hole CH1 may be disposed therein.

A common electrode COM may be disposed in two or more subpixels SP, wherein the common electrode COM may include a first common electrode COM1 and a second common electrode COM2 which are disclosed electrically separated from each other.

The first common electrode COM1 may be disposed in an area other than the area overlapping the data line DL. That is, the first common electrode COM1 may be disposed so as not to overlap the data line DL.

At least a portion of the second common electrode COM2 may be disposed in the area overlapping the data line DL. That is, the second common electrode COM2 may be disposed in such a way that it covers an area where the data line DL is disposed.

The first common electrode COM1 may include a first portion COM1a disposed on the same layer as the pixel electrode PXL, and a second portion COM1b disposed on the same layer as the gate line GL. Further, the first common electrode COM1 may be electrically connected to the first common electrode connection wiring COM1_CL through the second contact hole CH2, wherein the first common electrode connection wiring COM1_CL may be disposed on the same layer as the data line DL, and may be disposed in an area where no data line DL is disposed. For example, the first portion COM1a of the first common electrode COM1 is disposed on the same layer as the second common electrode COM2, and the second portion COM1b of the first common electrode COM1 is disposed on a different layer from the second common electrode COM2 and is electrically connected to the first portion COM1a.

The second common electrode COM2 may be electrically connected to the second common electrode connection wiring COM2_CL disposed on the same layer as the gate line GL, through the fifth contact hole CH5. This second common electrode connection wiring COM2_CL may be disposed on the same layer as the gate line GL. Further, the second common electrode connection wiring COM2_CL may be disposed between the gate line GL(i) and the gate line GL(i+1).

The first common electrode COM1 may be configured to receive the common voltage Vcom through the first common electrode connection wiring COM1_CL. Further, the second common electrode COM2 may be configured to receive the common voltage Vcom through the second common electrode connection wiring COM2_CL.

Here, a power source supplying the common voltage Vcom to the first common electrode COM1 may be different from a power source supplying the common voltage Vcom to the second common electrode COM2. In addition, a level of the common voltage Vcom supplied to the first common electrode COM1 may be the same as a level of the common voltage Vcom supplied to the second common electrode COM2.

Therefore, even if the first common electrode COM1 and the second common electrode COM2 are arranged to be electrically separated from each other, it may not substantially affect the display driving since the same level of common voltage Vcom is applied thereto.

Furthermore, since the first common electrode COM1 does not overlap the data line DL and the second common electrode COM2 overlaps the data line DL, the parasitic capacitance Cp formed by the second common electrode COM2 with the data line DL may be relatively large.

Therefore, even if a ripple in the common voltage Vcom applied to the second common electrode COM2 occurs due to voltage fluctuation in the data voltage Vdata applied to the data line DL, it may not affect the voltage level of the first common electrode COM1 electrically separated from the second common electrode COM2 and applied with the same level of the common voltage Vcom.

At this point, in the area where the sensor area S/A is disposed, the photo driving line PDL, the read-out line ROL and so on, instead of the first common electrode connection wiring COM1_CL, may be disposed in the area where the first common electrode connection wiring COM1_CL is arranged. That is, the first common electrode COM1 may be disposed in such a structure that it overlaps the photo driving line PDL and the read-out line ROL.

Further, since the second common electrode COM2 is arranged to overlap with the data line DL, it may be disposed not to overlap the read-out line ROL.

Thus, even if a variation in the voltage level of the second common electrode COM2 occurs due to the data voltage Vdata applied to the data line DL, the fluctuation in the voltage level of the first common electrode COM1 overlapping the read-out line ROL may not occur or may be relatively very small, if any.

Accordingly, it is possible to prevent the noise accruing from a signal applied for the display driving from being generated in the sensing signal detected through the read-out line ROL. Furthermore, it is also possible to improve the sensing performance using the phototransistor PHT disposed in some subpixels SP, by allowing the noise in the sensing signal detected through the read-out line ROL to decrease significantly.

By way of such noise reduction, it makes it possible to perform the sensing simultaneously with the display driving and thus, improve the sensitivity of sensing for a finger touching having less change in the quantity of light.

Figure 9:
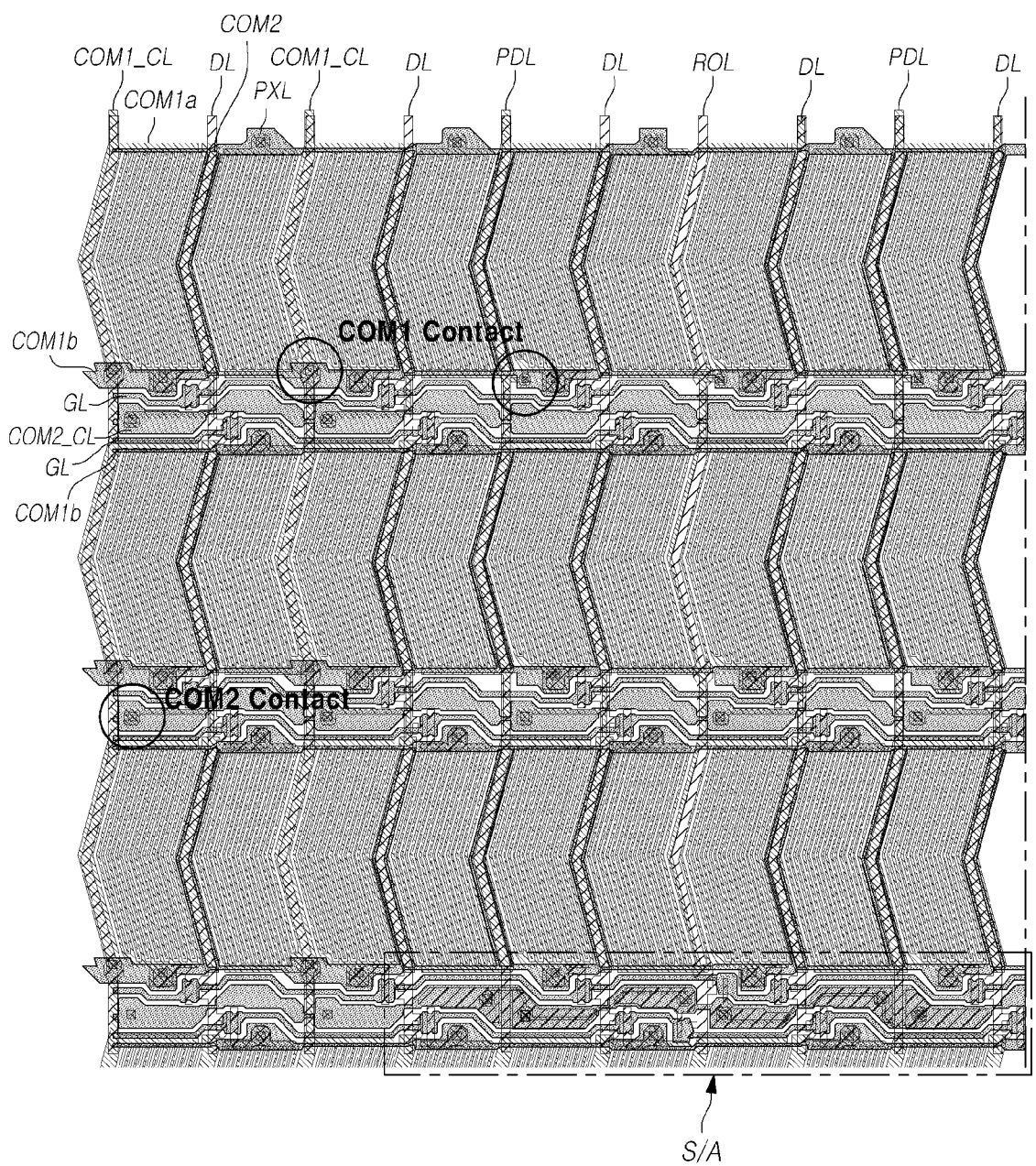
FIG. 9 illustrates an example of the structure of a subpixel disposed in a sensing unit area in the display device as shown in FIG. 8 according to embodiments of the present disclosure.

FIG. 9 illustrates an example of the structure of a subpixel disposed in a sensing unit area in the display device 100 as shown in FIG. 8.

Referring to FIG. 9, 9×3 subpixels SP may be arranged in one sensing unit area, for example. That is, it illustrates the example in which one sensor area S/A is disposed for 27 subpixels SP. Further, for example, four photo transistors PHT and two read-out transistors ROT may be arranged in one sensor area S/A.

The first common electrode COM1 may be disposed in an area other than the area where the data line DL is disposed, and it may be disposed to overlap the first common electrode connection wiring COM1_CL, the photo driving line PDL, and the read-out line ROL. In addition, the first common electrode COM1 may be electrically connected to the first common electrode connection wiring COM1_CL.

Here, the first common electrode COM1 overlapping the read-out line ROL and the photo driving line PDL may not overlap the first common electrode connection wiring COM1_CL. Thus, the first common electrode COM1 being positioned in the area in which the photo driving line PDL or the read-out line ROL is disposed, among the two in-between areas of the data lines DL, may be electrically connected to the second portion COM1b of the first common electrode COM1 disposed on the same layer as the gate line GL.

In other words, one or more connecting points between the first portion COM1a and the second portion COM1b of the first common electrode COM1 may be provided in an area overlapping the area in which the photo driving line PDL or the read-out line ROL is disposed.

The second common electrode COM2 may be electrically connected to the second common electrode connection wiring COM2_CL positioned between the gate lines GL. This second common electrode connection wiring COM2_CL may be arranged in a subpixel SP row other than the subpixel SP row including the sensor area S/A.

Since the photo control line PCL is disposed in the subpixel SP row including the sensor region S/A, the second common electrode connection wiring COM2_CL may be in a subpixel SP row in which any sensor region S/A is not disposed, and then be electrically connected to the second common electrode COM2.

As described above, as the first common electrode COM1 overlapping the read-out line ROL is arranged electrically separated from the second common electrode COM2 overlapping the data line DL, in one sensing unit area, it is possible to prevent the noise caused by the data voltage Vdata applied to the data line DL from affecting the sensing signal detected through the read-out line ROL.

Figure 10:
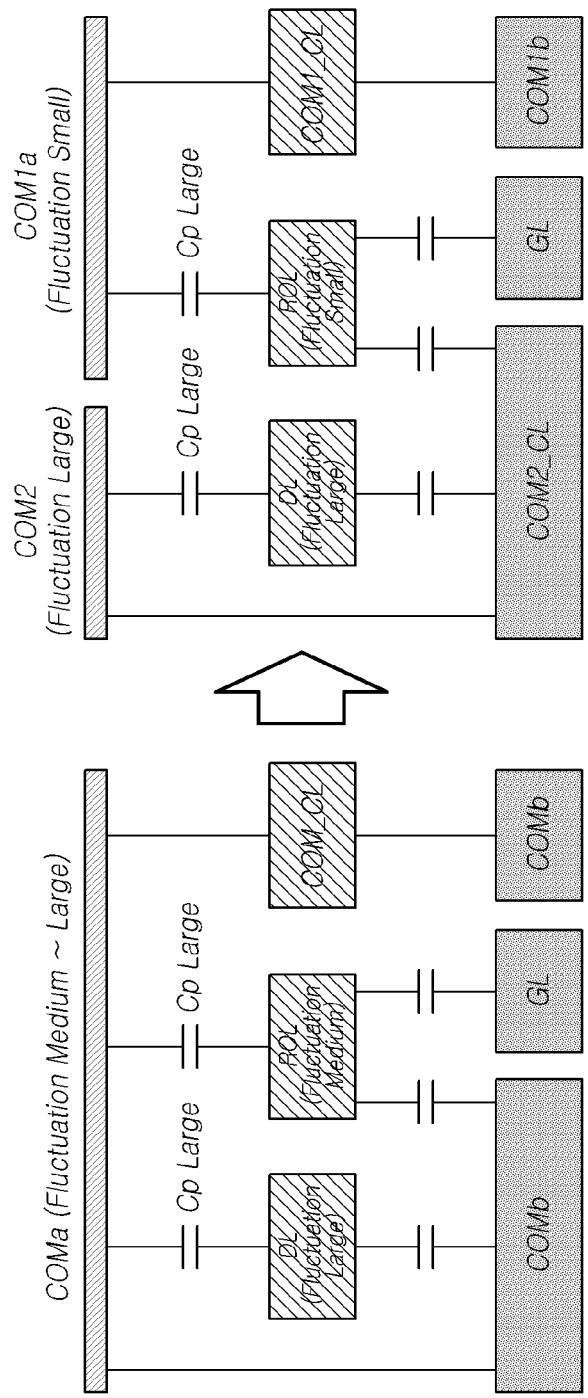
FIGS. 10 and 11 are views to illustrate the noise reduction effect in a sensing signal in the display device as shown in FIG. 8 according to embodiments of the present disclosure.
Figure 11:
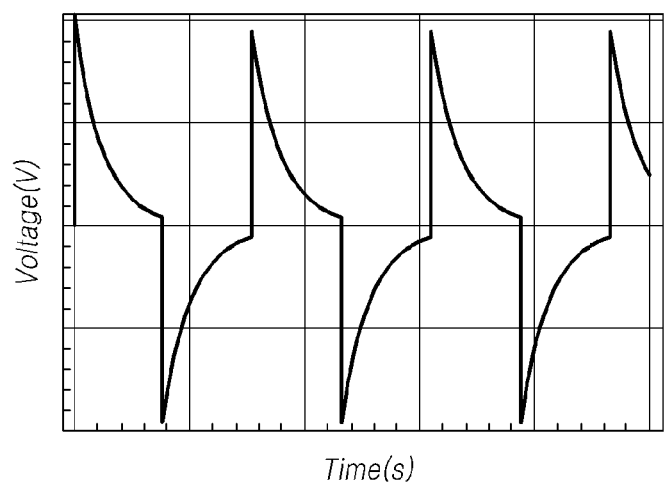
Figure 11:
Figure 11:
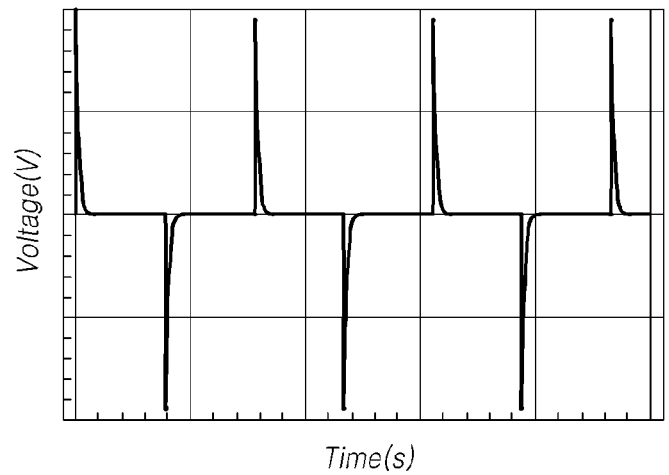

FIGS. 10 and 11 each illustrate the noise reduction effect of the sensing signal in the display device 100 as shown in FIG. 8.

Referring first to FIG. 10, when the common electrode COM is arranged without being separated into the first common electrode COM1 and the second common electrode COM2, the first portion COMa of the electrode COM disposed on the same layer as the pixel electrode PXL may form the parasitic capacitance Cp with the data line DL. Then, the first portion COMa of the common electrode COM may form such a parasitic capacitance Cp with the read-out line ROL as well.

Accordingly, when it occurs a large level of voltage variation in the data voltage Vdata applied to the data line DL, it can cause a large amount of fluctuation in the signal level detected through the read-out line ROL by the first portion COMa of the common electrode COM coupled with the data line DL.

On the other hand, in case where the first common electrode COM1 is disposed separately from the second common electrode COM2, the first portion COM1a of the first common electrode COM1 overlapping the read-out line ROL and the second common electrode COM2 overlapping with the data line DL, among the common electrodes COM disposed on the same layer as the pixel electrode PXL, may be electrically separated from each other.

Further, the first portion COM1a of the first common electrode COM1 may be disposed not to overlap the data line DL, and the second common electrode COM2 disposed not to overlap the read-out line ROL.

Therefore, even if it occurs a large voltage variation in the data voltage Vdata applied to the data line DL, it will eventually result in only a large voltage variation in the second common electrode COM2 in which a large scale of the parasitic capacitance Cp is formed with the data line DL.

In addition, since the second common electrode COM2 is disposed not to overlap the read-out line ROL, the voltage fluctuation in the second common electrode COM2 may not significantly affect the signal level in the read-out line ROL.

Further, even if the read-out line ROL forms a large parasitic capacitance Cp with the first common electrode COM1, the first common electrode COM1 is electrically separated from the second common electrode COM2, so it is possible to prevent the influence due to the fluctuation in voltage level in the second common electrode COM2 from affecting the read-out line ROL through the first common electrode COM1.

Referring then to FIG. 11, when the first common electrode COM1 and the second common electrode COM2 are not separated, the integral value of the ripples in the common voltage Vcom applied to the common electrode COM may appear be output in a large scale.

On the other hand, when the first common electrode COM1 forming a large parasitic capacitance Cp with the read-out line ROL is disposed electrically separate from the second common electrode COM2 forming a large parasitic capacitance Cp with the data line DL, the integral value of the ripples in the common voltage Vcom may appear in a small scale even if it occurs.

Since the noise affecting the sensing signal is reflected in an integral value according to the ripples of the common voltage Vcom, it is possible to reduce the noise of the sensing signal detected through the read-out line ROL, by decreasing the integral value of the ripples in the common voltage Vcom applied to the first common electrode COM1 overlapping the read-out line ROL.

According to the embodiments of the present disclosure described heretofore, it is possible to recognize a user's touching onto the display panel 110 or external light irradiated onto the display panel 110 by a laser pointer or the like, by arranging the phototransistor PHT in some subpixels SP of the display panel 110.

In addition, it is possible to sense any external input on the display panel 110 simultaneously with the display driving, by controlling the read-out transistor ROT for detecting the electrical charges accumulated by the off-current of the photo transistor PHT, by means of the gate line GL.

Furthermore, the first common electrode COM1 overlapping the read-out line ROL from which the sensing signal is detected can be disposed separately from the second common electrode COM2 overlapping the data line DL to which the data voltage Vdata is applied, thereby enabling to improve the sensing performance, and can be used to reduce the disadvantageous effect that the noise caused by the display driving affects the sensing signal detected through the read-out line ROL.

The above description has been presented to enable any person skilled in the art to make and use the technical idea of the present invention, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A display device comprising:
    a display panel in which a plurality of gate lines, a plurality of data lines, and plurality of subpixels are disposed;
    a plurality of photo transistors disposed in at least one subpixel of the plurality of subpixels, a photo transistor controlled by a photo control signal applied to a photo control line, and electrically connected to a photo driving line to which a photo driving voltage is applied;
    a plurality of read-out transistors electrically connected between the photo transistor and a read-out line and electrically connected to the plurality of gate lines electrically connected to gate nodes of a plurality of driving transistors disposed in the plurality of subpixels;
    a first common electrode partially overlapping the read-out line, the first common electrode including a first portion and a second portion; and
    a second common electrode partially overlapping the data line,
    wherein the first portion of the first common electrode and the second portion of the first common electrode are electrically connected to each other via a contact hole, and
    wherein the second portion of the first common electrode is in a different layer than the first portion of the first common electrode and is in a same layer as the photo control line,
    wherein the photo control line is disposed at a position corresponding to another second portion of the first common electrode disposed between gate lines.

2. The display device according to claim 1, wherein the first common electrode and the second common electrode are each configured to receive a common voltage from different power sources.

3. The display device according to claim 1, wherein a level of a first common voltage applied to the first common electrode is the same as a level of a second common voltage applied to the second common electrode.

4. The display device according to claim 1, wherein the first common electrode is disposed in an area except for an area overlapping the data line.

5. The display device according to claim 1, wherein a portion of the first common electrode is disposed to overlap the photo driving line.

6. The display device according to claim 1, wherein the second common electrode is disposed in an area except for an area overlapping the read-out line.

7. The display device according to claim 1, further comprising a first common electrode connection wiring disposed in an area other than an area in which the data line, the photo driving line, and the read-out line are disposed, and the first common electrode connection wiring electrically connected to the first common electrode.

8. The display device according to claim 1, further comprising a second common electrode connection wiring disposed in a subpixel row other than a subpixel row in which the photo control line is disposed, and electrically connected to the second common electrode.

9. The display device according to claim 8, wherein the second common electrode connection wiring is disposed between two gate lines.

10. The display device according to claim 1, wherein the photo control signal at a level to turn off the photo transistor is applied to the photo control line during a display driving period.

11. The display device according to claim 1, wherein the read-out transistor is controlled by a scan signal applied to the gate line.

12. The display device according to claim 1, wherein a portion of the photo control line is disposed to overlap an electrode connected between the photo transistor and the read-out transistor.

13. The display device according to claim 1, wherein at least one of the read-out line and the photo driving line is disposed between two data lines, and
    at least one connection point between the first portion of the first common electrode and the second portion of the first common electrode is provided in an area between the two data lines.

14. The display device according to claim 1, wherein
    at least one data line is disposed between the photo transistor and the read-out transistor, and
    the display device further comprises a connection pattern electrically connected between the photo transistor and the read-out transistor and disposed to intersect the at least one data line.

15. The display device according to claim 1, further comprising a pixel electrode, wherein the first common electrode and the second common electrode is disposed on a first layer same as the pixel electrode.

16. The display device according to claim 1, further comprising a second common electrode connection wiring electrically connected to the second common electrode, wherein the second common electrode connection wiring is disposed in a same layer as a gate line in the plurality of gate lines.

17. A display device comprising:
a plurality of driving transistors disposed in each of a plurality of subpixels;
a plurality of read-out transistors disposed in some subpixels of the plurality of subpixels;
a plurality of data lines electrically connected to the driving transistors;
a plurality of read-out lines electrically connected to the read-out transistors;
a plurality of photo transistors electrically connected to the plurality of read-out transistors, a photo transistor electrically connected to a photo control line;
a first common electrode partially overlapping the read-out line, the first common electrode including a first portion and a second portion;
a second common electrode partially overlapping the data line; and
a plurality of gate lines electrically connected to the plurality of driving transistors and the plurality of read-out transistors,
wherein the first portion of the first common electrode and the second portion of the first common electrode are electrically connected to each other via a contact hole, and
wherein the second portion of the first common electrode is in a different layer than the first portion of the first common electrode and is in a same layer as the photo control line,
wherein the photo control line is disposed at a position corresponding to another second portion of the first common electrode disposed between gate lines.

18. The display device according to claim 17, wherein the plurality of photo transistors are disposed in some subpixels of the plurality of sub pixels, wherein the photo transistor is controlled by a photo control signal applied to the photo control line, and electrically connected between a photo driving line and the read-out transistor.

19. The display device according to claim 17, wherein the plurality of gate lines are electrically connected to gate nodes of the driving transistors, and gate nodes of the read-out transistors.

20. The display device according to claim 17, wherein during a display driving period, a same level of a common voltage is applied to the first common electrode and the second common electrode, and power sources supplying the common voltage to the first common electrode and the second common electrode are different from each other.

21. The display device according to claim 17, wherein the first common electrode and the second common electrode are alternately arranged along a direction intersecting the data line and the read-out line.

* * * * *